United States Patent
Srinivasan et al.

(10) Patent No.: US 9,605,579 B2
(45) Date of Patent: Mar. 28, 2017

(54) SYSTEMS AND METHODS FOR MODEL BASED CONTROL OF CATALYTIC CONVERTER SYSTEMS

(71) Applicant: General Electric Company, Schenectady, NY (US)

(72) Inventors: Prashant Srinivasan, Bangalore (IN); Maruthi Narasinga Rao Devarakonda, Waukesha, WI (US); Jassin Marcel Fritz, Garching (DE); Daniel George Norton, Niskayuna, NY (US); Sharath Sridhar Aramanekoppa, Bangalore (IN); Medy Satria, Munich (DE); William Collins Vining, Niskayuna, NY (US); Dipankar Deb, Bangalore (IN)

(73) Assignee: General Electric Company, Niskayuna, NY (US)

( * ) Notice: Subject to any disclaimer, the term of this patent is extended or adjusted under 35 U.S.C. 154(b) by 37 days.

(21) Appl. No.: 14/569,213

(22) Filed: Dec. 12, 2014

(65) Prior Publication Data

US 2016/0169077 A1    Jun. 16, 2016

(51) Int. Cl.
*F01N 3/00* (2006.01)
*F01N 3/10* (2006.01)
(Continued)

(52) U.S. Cl.
CPC ............ *F01N 11/007* (2013.01); *F01N 3/101* (2013.01); *F01N 9/00* (2013.01); *F01N 9/005* (2013.01);
(Continued)

(58) Field of Classification Search
CPC ............... F02D 41/145; F02D 41/1453; F02D 41/1454; F02D 41/1441; F02D 41/0295; F01N 3/0864
(Continued)

(56) References Cited

U.S. PATENT DOCUMENTS 5,678,402 A * 10/1997 Kitagawa ................ F01N 9/005
60/276
6,282,889 B1 * 9/2001 Kakuyama .......... F02D 41/0295
60/274
(Continued)

FOREIGN PATENT DOCUMENTS

DE    102013009476 A1    12/2014
GB    2391324 A    2/2004

OTHER PUBLICATIONS

Michael Tomforde, et al.; XI International PHD Workshop OWD, Three-Way Catalyst Models for Oxygen Storage Based Control of the Air-Fuel Ratio, pp. 106-111, 2009.
(Continued)

*Primary Examiner* — Thomas Denion
*Assistant Examiner* — Diem Tran
(74) *Attorney, Agent, or Firm* — Ann M. Agosti (57) ABSTRACT

A system includes a controller that has a processor configured to receive a first signal from a first oxygen sensor indicative of a first oxygen measurement, wherein the first oxygen sensor is disposed upstream of a catalytic converter system; and to receive a second signal from a second oxygen sensor indicative of a second oxygen measurement, wherein the second oxygen sensor is disposed downstream of the catalytic converter system; and to execute a catalyst estimator system, wherein the catalyst estimator system is configured to derive an oxygen storage estimate based on the first signal, the second signal, and a catalytic converter model. The processor is configured to derive a system oxygen
(Continued)

storage setpoint for the catalytic converter system based on the catalytic converter model and the oxygen storage estimate.

20 Claims, 6 Drawing Sheets

(51) Int. Cl.
    *F01N 11/00* (2006.01)
    *F02C 9/00* (2006.01)
    *F01N 9/00* (2006.01)
    *F02D 41/14* (2006.01)

(52) U.S. Cl.
    CPC ............ *F02C 9/00* (2013.01); *F01N 2550/02* (2013.01); *F01N 2560/025* (2013.01); *F01N 2900/0406* (2013.01); *F01N 2900/1624* (2013.01); *F02D 2041/1417* (2013.01)

(58) Field of Classification Search
    USPC .......................................... 60/277, 285, 299
    See application file for complete search history.

(56) References Cited

U.S. PATENT DOCUMENTS

| | | | |
|---|---|---|---|
| 6,637,194 B2 | 10/2003 | Kakuyama et al. | |
| 6,718,754 B2 | 4/2004 | Kobayashi et al. | |
| 6,993,899 B2 * | 2/2006 | Lewis | F01N 3/0842 60/274 |
| 7,003,945 B2 | 2/2006 | Tamura | |
| 7,162,862 B2 * | 1/2007 | Nagai | B01D 53/9495 60/276 |
| 7,370,471 B2 | 5/2008 | Satou et al. | |
| 7,618,605 B2 | 11/2009 | Morita et al. | |
| 7,654,252 B2 * | 2/2010 | Kato | F02D 41/1441 123/672 |
| 8,069,652 B2 | 12/2011 | Iihoshi et al. | |
| 8,649,956 B2 | 2/2014 | Kawamura et al. | |
| 2002/0011068 A1 * | 1/2002 | Kako | F01N 11/007 60/285 |
| 2004/0040286 A1 | 3/2004 | Fiengo et al. | |
| 2005/0267669 A1 | 12/2005 | Wang et al. | |
| 2008/0229727 A1 | 9/2008 | Wang et al. | |
| 2014/0041362 A1 | 2/2014 | Ulrey et al. | |
| 2015/0013311 A1 | 1/2015 | Horst et al. | |

OTHER PUBLICATIONS

Claude Descorme, et al.; Oxygen Storage Capacity Measurements of Three-Way Catalysts Under Transient Conditions; vol. 223, Issues 1-2, pp. 287-299, Jul. 30, 2001.

Giovanni Fiengo, et al.; FORE-AFT Oxygen Storage Contron;Preceedings of the American Control Conference; Anchorage, AK, May 8-10, 2002.

Kenneth R. Muske, et al.; Estimating the Oxygen Storage Level of a Three-Way Automotive Catalyst; Proceedings of the 2004 American Control Conference, Boston, Massachusetts, Jun. 30-Jul. 2, 2004.

Balenovic., "Modeling and model-based control of a three-way catalytic converter", 2002.

Kiwitz et al., "Control-oriented modeling of a three-way catalytic converter with observation of the relative oxygen level profile", Journal of Process Control, vol. No. 22, 2012.

European Search Report and Written Opinion issued in connection with corresponding EP Application No. 15199342.5 on Oct. 28, 2016.

* cited by examiner

SYSTEMS AND METHODS FOR MODEL BASED CONTROL OF CATALYTIC CONVERTER SYSTEMS

BACKGROUND

The subject matter disclosed herein relates to model based control of catalytic converter systems. Specifically, the subject matter described below relates to systems and methods for controlling certain parameters of a catalytic converter system.

Gas turbine and engine systems provide power for a variety of applications, such as oil and gas processing systems, commercial and industrial buildings, and vehicles. The turbine and gas engine systems may be fluidly coupled to a catalytic converter system, such as three-way catalytic converters suitable for controlling emissions of certain oxides, such as nitrogen oxides. The engine systems include or are coupled to a control system that oversees the operation of the engine system. The control system may improve efficiency of the engine system, and provide other functionality. For example, the control system may improve the efficiency of internal combustion engine systems by controlling the air-to-fuel ratio of the engine, which represents the amount of air provided to the engine relative to the amount of fuel provided to the engine. Depending on desired applications, the control system may try to keep the air-to-fuel ratio near stoichiometry. Other applications may keep the air-to-fuel ratio in a range between rich (i.e., excess fuel) and lean (i.e., excess air).

As will be appreciated, engine systems produce exhaust gases as a result of burning fuel; and the type of exhaust gases emitted may depend in part on the type and amount of fuel provided to the engine system. Many industries and jurisdictions (e.g., coal-burning plants, federal and state governments, etc.) may have regulations and restrictions specifying the types and amounts of exhaust gases that different gas engine systems are permitted to emit.

To comply with regulations and restrictions, the gas engine system may use the catalytic converter system to control emissions. The catalytic converter system receives the exhaust gases and substantially converts the exhaust gases into other types of gases permitted by regulations and restrictions. The performance of the catalytic converter system may impact the performance of the gas engine, and vice versa. It would be beneficial to improve the performance of the gas engine and catalytic convertor systems via the control system.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a controller that has a processor. The processor is configured to receive a first signal from a first oxygen sensor indicative of a first oxygen measurement, wherein the first oxygen sensor is disposed upstream of a catalytic converter system. The processor is additionally configured to receive a second signal from a second oxygen sensor indicative of a second oxygen measurement, wherein the second oxygen sensor is disposed downstream of the catalytic converter system. The processor is further configured to execute a catalyst estimator system, wherein the catalyst estimator system is configured to derive an oxygen storage estimate based on the first signal, the second signal, and a catalytic converter model. The processor is also configured to derive a system oxygen storage setpoint for the catalytic converter system based on the catalytic converter model and the oxygen storage estimate, and to compare the oxygen storage estimate with the system oxygen storage setpoint, wherein the processor is configured to apply the comparison during control of a gas engine.

In a second embodiment, a system includes a gas engine system that has a gas engine fluidly coupled to a catalytic converter system and a catalytic controller operatively coupled to the gas engine and communicatively coupled to the catalytic converter. The catalytic controller has a processor configured to receive a first signal from a first oxygen sensor indicative of a first oxygen measurement, wherein the first oxygen sensor is disposed upstream of a catalytic converter system. The processor is additionally configured to receive a second signal from a second oxygen sensor indicative of a second oxygen measurement, wherein the second oxygen sensor is disposed downstream of the catalytic converter system. The processor is further configured to execute a catalyst estimator system, wherein the catalyst estimator system is configured to derive an oxygen storage estimate based on the first signal, the second signal, and a catalytic converter model. The processor is also configured to derive a system oxygen storage setpoint for the catalytic converter system based on the catalytic converter model and the oxygen storage estimate, and to compare the oxygen storage estimate with the system oxygen storage setpoint, wherein the processor is configured to apply the comparison during control of a gas engine. The processor is additionally configured to derive an air-to-fuel ratio (AFR) setpoint based on the comparison, wherein the AFR setpoint is applied to control the gas engine.

In a third embodiment, a method includes receiving a first signal from a first oxygen sensor indicative of a first oxygen measurement, wherein the first oxygen sensor is disposed upstream of a catalytic converter system. The method additionally includes receiving a second signal from a second oxygen sensor indicative of a second oxygen measurement, wherein the second oxygen sensor is disposed downstream of the catalytic converter system. The method further includes executing a catalyst estimator system, wherein the catalyst estimator system is configured to derive an oxygen storage estimate based on the first signal, the second signal, and a catalytic converter model. The method also includes deriving a system oxygen storage setpoint for the catalytic converter system based on the catalytic converter model and the oxygen storage estimate, and comparing the oxygen storage estimate with the system oxygen storage setpoint to apply the comparison during control of a gas engine.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Various embodiments relate to controlling the catalytic converter system fluidly coupled to, for example, a turbine or a gas engine. In one embodiment, a catalytic estimator may be provided, suitable for estimating, as an example, an oxygen storage state of a three-way catalyst. The catalytic estimator may be provided as an Adaptive Extended Kalman filter (AEKF), and the AEKF may use a calibrated kinetic model of the three-way catalyst, as further described below. During operations, the catalytic estimator may receive sensor inputs from various locations, such as locations at the inlet of the three-way catalyst, the outlet of the three-way catalyst, and/or at intermediate points in the three-way catalyst. The sensor inputs may include lambda sensor inputs measuring a proportion of oxygen (O2) at the lambda sensor's location, as well as temperature sensors, nitrogen oxides (NOx) sensors, carbon oxides (COx) sensors, mass flow sensors, pressure sensors, and the like. Engine-out emissions and corresponding emission species concentrations may also be predicted, based on current engine conditions. The catalytic estimator may use the sensor data to increase estimation accuracy of the behavior of the three-way catalyst, for example, by adaptively modifying itself or the underlying kinetic model to capture catalyst degradation or ageing, variations among individual catalysts, and so on.

A model based control (MBC) system that oversees the operation of the engine system may then be used to control certain aspects of the catalytic system, such as an amount of oxygen stored, and provide more fine control of emissions species and amounts exiting the catalyst system. The MBC controller may, for example, determine a setpoint for the AFR based on the estimator's derivations of the catalyst system. The MBC controller may then adjust the AFR accordingly. By controlling the AFR, the engine may combust fuel to result, for example, in a desired catalytic O2 storage, exit flow, and so on, thus controlling the catalytic system. The control system may also use the estimated behavior of the catalytic converter for diagnostic purposes.

Figure 1:
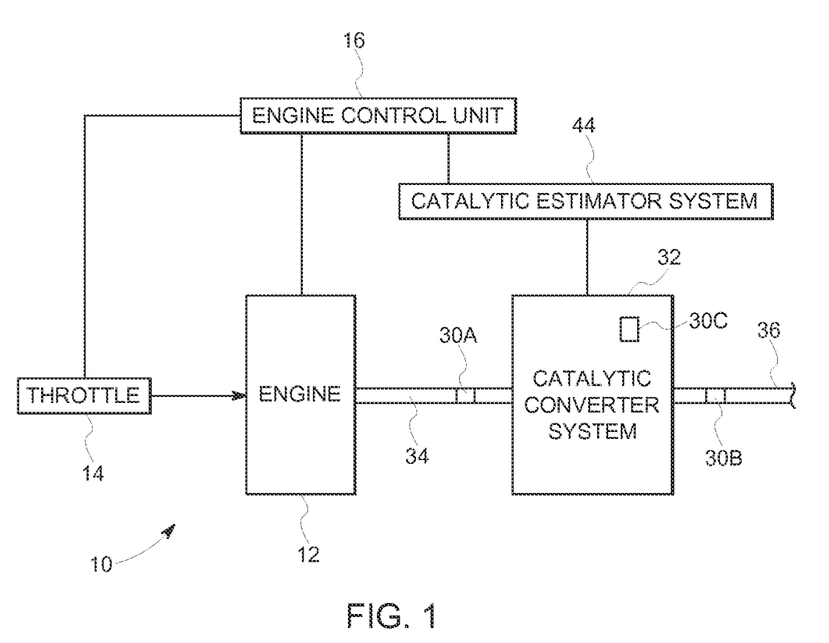
FIG. 1 is a block diagram of a gas engine system including a catalytic estimator system, in accordance with an embodiment.

Turning now to FIG. 1, a gas engine system 10 is depicted, suitable for combusting fuel to produce power for a variety of applications, such as power generation systems, oil and gas systems, commercial and industrial buildings, vehicles, landfills, and wastewater treatment. The gas engine 10 system includes a gas engine 12, such as a Waukesha™ gas engine available from the General Electric Company. The gas engine system 10 also includes a throttle 14 coupled to the gas engine 12. The throttle 14 may be a valve whose position controls the amount of fuel or air provided to the gas engine 12. As such, the position of the throttle 14 partly determines an air-to-fuel ratio (AFR) of the gas engine 12. The AFR represents the ratio between an amount of oxidant (e.g., oxygen) available to combust an amount of fuel provided to the gas engine 12.

The gas engine system 10 further includes an engine control unit 16, which may control the operation of the gas engine system 10, which is described in further detail below. To that end, the gas engine system 10 also includes sensors and actuators that may be used by the engine control unit 16 to perform various tasks. For example, as shown in FIG. 1, the gas engine system 10 may include sensors 30A, 30B, 30C that are disposed at different locations in the gas engine system 10. The sensors 30A, 30B, 30C may include lambda sensors (e.g., oxygen sensors), temperature sensors, mass flow sensors, pressure sensors, NOx sensors, CO sensors, and the like, that provide signals correlative to measurements for that particular location. The gas engine 12 may emit certain types and amounts of exhaust gases based on the type of fuel used. Certain industries and organizations (e.g., the oil and gas industry, coal-burning plants, federal and state governments, etc.) may have restrictions and regulations that specify the types and amounts of exhaust gases gas engines are permitted to emit.

To comply with these restrictions and regulations, the gas engine system 10 includes a catalytic converter system 32 coupled to an exhaust conduit 34 of the gas engine 12. The catalytic converter system 32 receives the exhaust gases from the gas engine 12 and captures the exhaust gas and/or converts the exhaust gases into other types of emissions permitted by restrictions and regulations. For example, the catalytic converter system 30 depicted in FIG. 1 may perform three conversions: 1.) converting nitrogen oxides to nitrogen and oxygen, 2.) converting carbon monoxide to carbon dioxide, and 3.) converting unburned hydrocarbons to carbon dioxide and water. That is, the catalytic converter system 32 depicted in FIG. 1 is a three-way catalyst. Other embodiments may use other types of catalytic converters. The converted gases may then exit the catalytic converter system 32 via an output conduit 36, which may lead to another component of the gas engine system 10 (e.g., another catalytic converter 32, a heat recovery system) or to a vent.

To oversee the catalytic converter system 32, the gas engine system 10 includes a catalytic estimator system 44, as shown in FIG. 1 and described in further detail below. The catalyst estimator system 44 may be part of the engine control unit 16 or may be a separate system that communicates with the engine control unit 16.

Figure 2:
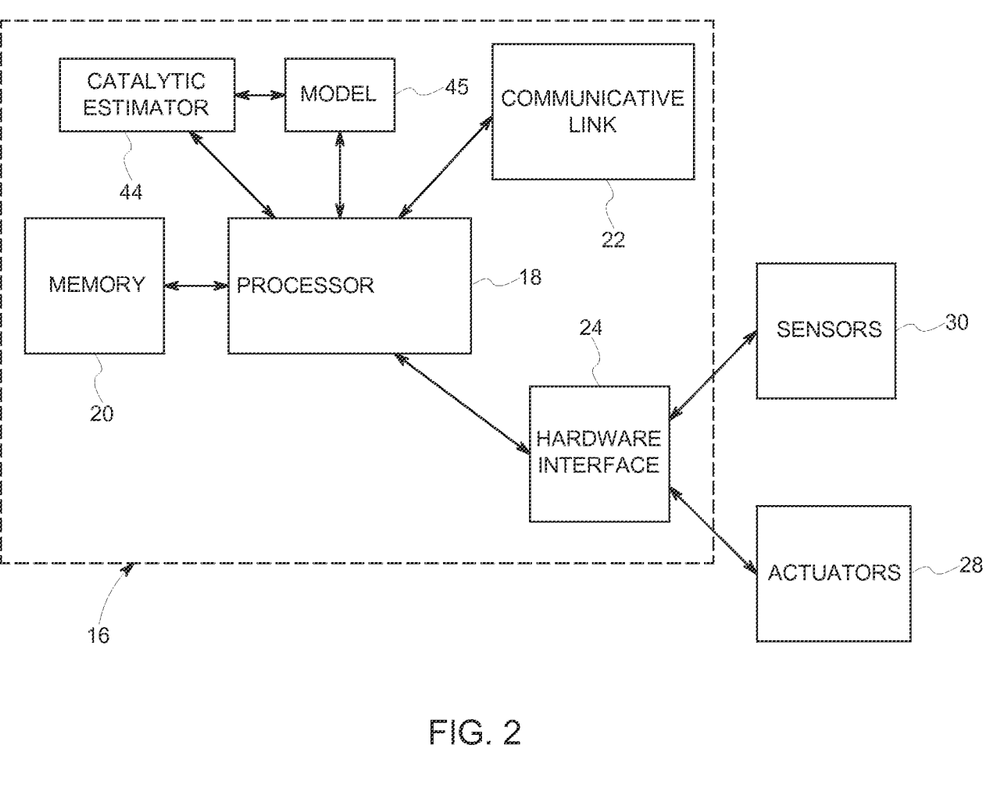
FIG. 2 is a block diagram of an engine control unit and catalytic estimator system for the gas engine system of FIG. 1, in accordance with an embodiment.

Turning now to FIG. 2, the engine control unit 16 includes a processor 18; a memory 20, a communicative link 22 to other systems, components, and devices; and a hardware interface 24 suitable for interfacing with sensors 30 (e.g., sensors 30A, 30B, 30C) and actuators 28. The processor 18 may include, for example, general-purpose single- or multi-chip processors. In addition, the processor 18 may be any conventional special-purpose processor, such as an application-specific processor or circuitry. The processor 18 and/or other data processing circuitry may be operably coupled to the memory 20 to execute instructions for running the engine control unit 16. These instructions may be encoded in programs that are stored in the memory 20. The memory 20 may be an example of a tangible, non-transitory computer-readable medium, and may be accessed and used to execute instructions via the processor 18.

The memory 20 may be a mass storage device (e.g., hard drive), a FLASH memory device, a removable memory, or any other non-transitory computer-readable medium. Additionally or alternatively, the instructions may be stored in an additional suitable article of manufacture that includes at least one tangible, non-transitory computer-readable medium that at least collectively stores these instructions or routines in a manner similar to the memory 20 as described above. The communicative link 22 may be a wired link (e.g., a wired telecommunication infrastructure or a local area network employing Ethernet) and/or wireless link (e.g., a cellular network or an 802.11x Wi-Fi network) between the engine control unit 16 and other systems, components, and devices. For example, the link 22 may be a controller area network (CAN) link, an on-board diagnostics (OBD) link, a Modbus link, and so on.

The sensors 30 may provide various signals to the engine control unit 16. For example, as mentioned above, the sensors 30 may include oxygen, temperature, mass flow, and/or pressure sensors 30A, 30B, 30C, disposed at different locations in the gas engine system 10 to provide signals correlative to oxygen, temperature, flow, and/or pressure measurements for that particular location. The actuators 28 may include valves, pumps, positioners, inlet guide vanes, switches, and the like, useful in performing control actions. For instance, the throttle 14 is a specific type of actuator 28.

Based on signals received from the sensors 30, the engine control unit 16 may determine if one or more control aspects of the gas engine system 10 should be changed and adjusts the control aspect accordingly using an actuator 28. For instance, the engine control unit 16 may endeavor to improve the efficiency of the gas engine 12 by controlling the AFR of the gas engine 12. In particular, the engine control unit 16 may attempt to keep the AFR of the gas engine 12 at a desired ratio, such as near stoichiometry. In other embodiments, the engine control unit 16 may attempt to keep the AFR of the gas engine 12 within a narrow band of acceptable values, including values where the AFR includes rich (i.e., excess fuel) burns and lean (i.e., excess air) burns, depending on desired engine 12 applications.

The engine control unit 16 may also include the catalytic estimator system 44. During engine 12 operations, the catalytic estimator system 44 may be continuously providing various estimates of the state of the catalytic system 32, such as an amount of O2 that is being stored by the catalytic system 32, as well as amounts of certain species of interest, such as NOx and COx that may be emitted into the environment. The engine control unit 16 may use this information to more efficiently operate the engine 12 as well as to better maintain regulatory emissions compliance. The catalytic estimator system 44 may use or include a model 45, such as a kinetic first principle chemical model of the catalytic converter 32 suitable for modeling the chemical reactions taking place in the catalytic converter and including appropriate calibrations for mass transfer and energy transfer. It is to be noted that the engine control unit 16 may be thus be a controller, such as a catalytic controller, suitable for controlling the catalytic system 32. It is also to be noted that, while the estimator 44 is depicted as included in the control unit 16, the estimator 44 may be separate from the controller 44 and may thus be a controller as well, such as a catalytic controller, suitable for controlling the catalytic system 32.

The model 45 may include sub models, such as additional kinetic models, reactor models, and the like. Kinetic models may include models describing carbon monoxide oxidation, ethylene oxidation, acetylene oxidation, methane oxidation, and/or the reduction of nitrogen oxides. For example, the models may be based on the adsorption rate of a component i on noble metal, which may be given by Equation 1.

$$r_{a,i} = k_{a,i} L_{N,M} C_{s,i} \theta^* \qquad \text{Equation (1):}$$

For Equation 1, k is an adsorption rate coefficient, L is a capacity of catalyst phase, C is a concentration (e.g., molar), and $\theta^*$ determines a fraction of empty ceria surface. The adsorption rate coefficient can be found via first principles, e.g., kinetic gas theory. The reactor models may model a one or more dimensional adiabatic reactor based on the geometry of the catalytic converter system 32, including channels, axial gradients, and heat and mass transfer coefficients based on laminar flow from bulk gas to catalyst washcoat. The kinetic model 45 may be calibrated for a specific catalytic converter system 32, for example, by running the system 32 in various conditions, including lean burn and rich burn conditions. Accordingly, it may be useful to describe an embodiment of the catalytic converter system 32 in more detail.

Figure 3:
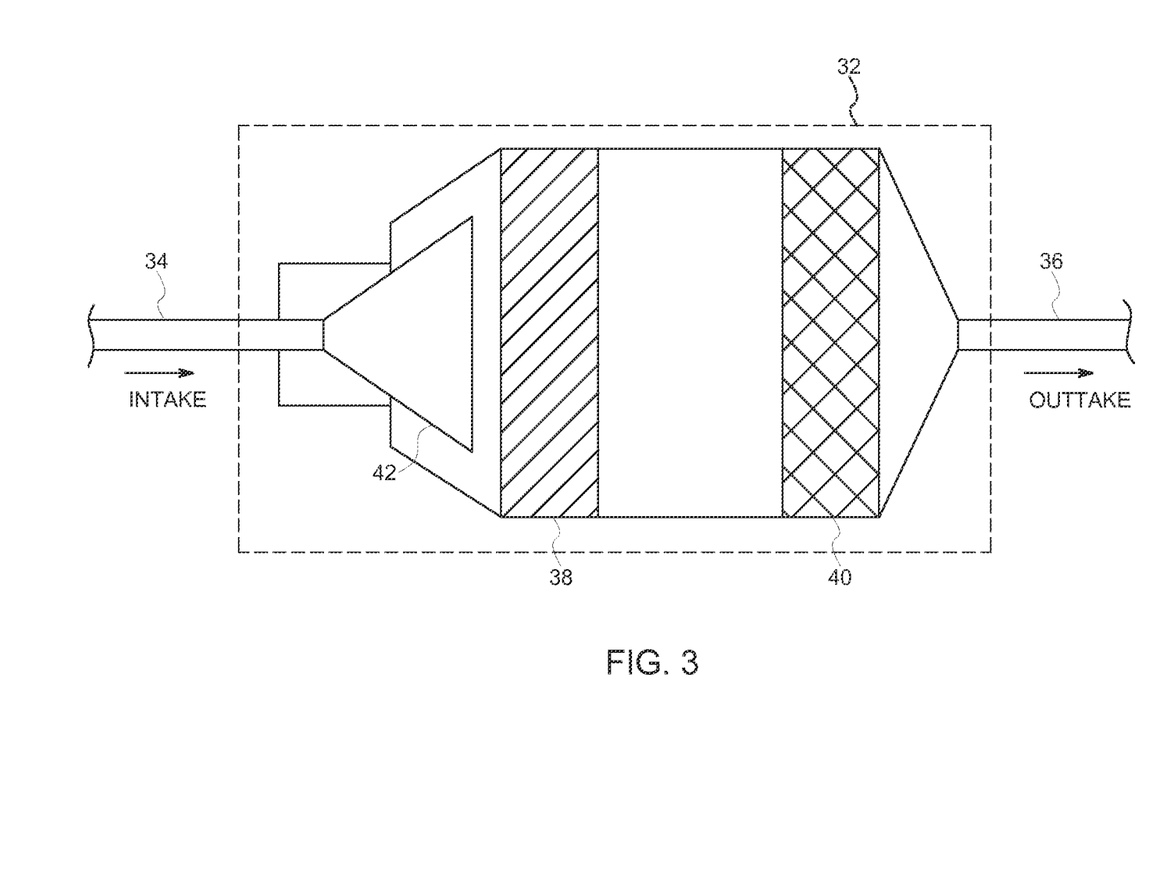
FIG. 3 is a cross-sectional of a catalytic converter system included in the gas engine system of FIG. 1, in accordance with an embodiment.

Turning now to FIG. 3, an embodiment of the catalytic converter system 32 may include at least two catalytic structures, a reduction catalyst 38 and an oxidation catalyst 40. Both of the catalytic structures may comprise ceramic structures coated with a noble metal catalyst, such as platinum, rhodium, and palladium. The catalytic structures may comprise honeycomb shaped or ceramic beads, and may be divided into cells, which are measured per square inch.

As depicted in FIG. 3, the exhaust gases, coming from the exhaust conduit 34, first encounter the reduction catalyst 38. The reduction catalyst 38 may be coated with one or more of a platinum group metal (PGM) coating, including ruthenium, rhodium, palladium, osmium, iridium, and/or platinum, and reduces the nitrogen oxides in the exhaust gases to nitrogen and oxygen. Next, the gases encounter the oxidation catalyst 40, which may be coated with one or more PGM coating. The oxidation catalyst 38 oxidizes the unburned hydrocarbons in the exhaust gases to carbon dioxide and water, and the carbon monoxide in the exhaust gases to carbon dioxide. Finally, the converted gases exit the catalytic converter system via the output conduit 36.

In certain embodiments, the catalytic converter system 32 may include a diffuser 42 positioned between the exhaust shaft 34 and the reduction catalyst 38. The diffuser 42 scatters the exhaust gases evenly across the width of the catalytic structures in the catalytic converter system 32. As a result, a larger amount of the exhaust gases may come into contact with the front end of the catalytic structures, allowing them to convert a large amount of the exhaust gases within a shorter distance. Further, scattering the exhaust gases using the diffuser 34 may also reduce the likelihood that different areas of the catalytic structures age at varying rates due to different concentration of the exhaust gases in particular areas.

As mentioned above, the engine control unit 16 may control the AFR of the gas engine 12 so as to control the catalytic converter system 32 and improve the efficiency of the gas engine 12. To do so, the engine control unit 16 may monitor a number of factors, such as the exhaust gas composition entering and/or exiting the catalytic converter system 32, in order to determine any adjustments to the AFR of the gas engine 12. In many situations, the performance of the catalytic converter system 32 may also provide an indication of whether and how the AFR of the gas engine 12 should be adjusted. For example, if the amount of oxidation of exhaust gases is below a certain threshold, it may be an indication that the gas engine is not receiving enough oxygen and the air-to-fuel ratio should be adjusted to become leaner.

Figure 4:
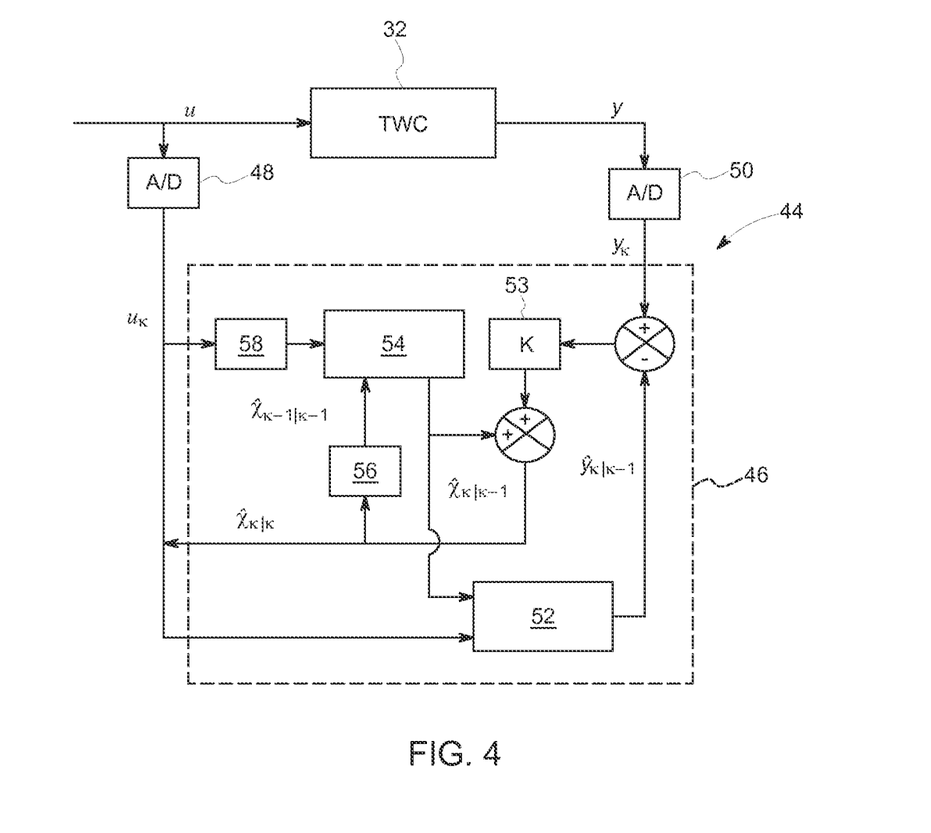
FIG. 4 is a block diagram of an Adaptive Extended Kalman Filter (AEKF) system included in the catalytic estimator system of FIG. 1, in accordance with an embodiment.

To improve the control of the AFR of the gas engine 12, the engine control unit 16 may work in conjunction with the catalyst estimator system 44. That is, the engine control unit 16 may control the AFR of the gas engine 12 based on feedback from the catalyst estimator system 44. As depicted in FIG. 4, an embodiment of the catalyst estimator system 44 may include an Adaptive Extended Kalman Filter (AEKF) system 46 suitable for estimating, for example, the oxygen storage and release of the catalytic converter system 32. The "extended" portion of the AEKF may be more suitable for analyzing non-linear data, unlike traditional Kalman filter techniques.

The catalyst estimator system 44 may estimate and monitor the operation of the catalytic converter system 32. In particular, the catalyst estimator system 44 may estimate and monitor the oxygen storage dynamics of the catalytic converter system 32. Ideally, the catalytic converter system 32 receives suitable oxygen from the fuel or the oxidation structure 40 to oxidize the unburned hydrocarbons and/or the carbon monoxide. That is, the amount of oxygen received from fuel or stored in the oxidation structure 40 may then determine the performance of the catalytic converter system 32 for two of its main functions, converting unburned hydrocarbons to carbon dioxide and water and carbon monoxide to carbon dioxide. As such, the oxygen storage dynamics of the catalytic converter system 32 may be a suitable indicator of the performance of the catalytic converter system 32. However, it should be appreciated that the catalyst estimator system 44 may be used to estimate and monitor other performance indicators for the catalytic converter system 32, such as temperature, mass flow, concentration of species of interest (e.g., COx, NOx, methane), pressure, and so on.

To that end, a measurement u representative of signals received from the sensors 30 upstream (or inside the catalytic converter system 32) may be processed by an analog-to-digital (A/D) converter 48 into values $u_k$. Likewise, output signals y representative of sensors 30 downstream (or inside the catalytic converter system 32) may be processed by an A/D converter 50 into values $y_k$ may be used to as feedback to improve the AEKF system 46. For example, $y_k$ may be summed while an output of observation h block 52 (e.g., output of $h(\hat{X}_{k|k-1}, u_k)$) may be subtracted to arrive at a value K (shown via element number 53), e.g., optimal Kalman gain with updates. $\hat{X}$ may represent an estimated value (e.g., oxygen storage, temperature, mass flow, pressure, species concentration) arrived at via the kinetic model 45. The value K may then be summed with an output of an $f_d$ block 54 (e.g., $f_d(\hat{X}_{k-1|k-1}, u_{k-1})$), the sum which may then be used an input to block 56 (e.g., $z^{-1}$, representative of the square root of an observation of the true state), as well as to the block 52. $u_k$ may also be used as input to a block 58 (e.g., $z^{-1}$) which may provide its output to block 54.

In one embodiment, an augmented state-parameter model for the AEKF system 46 may include:

$$\begin{bmatrix} X_k \\ \theta_k \end{bmatrix} = \begin{bmatrix} f_d(x_{k-1}, u_{k-1} \cdot \theta_{k-1}) \\ \theta_{k-1} \end{bmatrix} + \begin{bmatrix} w^x_{k-1} \\ w^\theta_{k-1} \end{bmatrix} \quad \text{Equation (2)}$$

where $y_k = h(x_k, u_k, \theta_{k-1}) + v_k$, and $\theta_L \leq \theta_k < \theta_U$, and a weight matrix w is a two element matrix as shown.

An augmented state-parameter vector may include:

$$x_k = [x_k \theta_k]^T \quad \text{Equation (3):}$$

Where θ is representative of a fractional surface ceria coverage, and T is temperature. It is to be note that other Kalman filter systems may be used, as well as or in addition to the system 46. It is also to be noted that other techniques, such as neural networks, genetic algorithms, expert systems, and the like, may be used in addition to or alternative to the system 46.

To evaluate the oxygen storage dynamics of the catalytic converter system 32, the catalyst estimator system 44 estimates, via the AEKF system 46 the oxygen storage dynamics of the catalytic converter system 32. The control system 16 also determines a system oxygen storage setpoint for the catalytic converter system based on desired operating conditions (e.g., lean burn, rich burn), desired emissions levels (e.g. levels suitable for maintaining regulatory emissions compliance), catalytic degradation (e.g., degradation determined via the estimator 44), and so on. The engine control unit 16 then determines a setpoint for the AFR of the gas engine 12 based on the comparison between the oxygen storage estimates and the oxygen storage setpoints and adjusts the AFR accordingly. In certain embodiments, the catalyst estimator system 44 may determine the AFR setpoint instead of the engine control unit 16. Further, the catalyst estimator system 44 may adjust the AFR in certain embodiments. Regardless, the AFR setpoint may then be used by the engine control unit 16 to provide for control of various actuators, including fuel delivery actuators, and so on.

Figure 5:
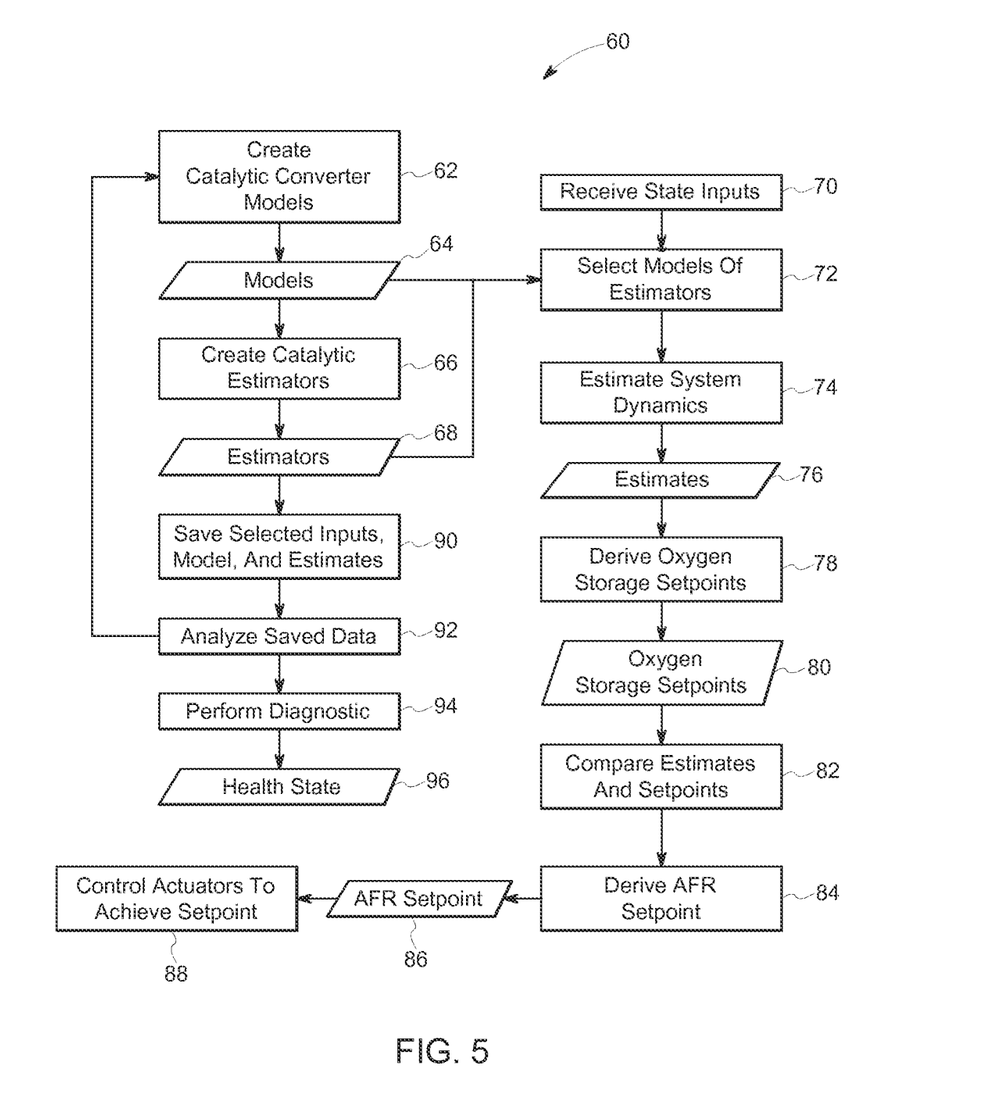
FIG. 5 is a flow chart depicting a method of operation for the catalytic estimator system of FIG. 1, in accordance with an embodiment.

FIG. 5 depicts an embodiment of a process 60 suitable for defining and applying the catalyst estimator system 44. Although the process 60 is described below in detail, the process 60 may include other steps not shown in FIG. 5. Additionally, the steps illustrated may be performed concurrently or in a different order. Further, as will be appreciated, a portion of the steps of process 60 may be performed while the gas engine system 10 is offline (i.e., not in operation). The process 60 may be implemented as executable code or instructions stored in a computer-readable medium (e.g., memory 20) and executable via one or more processors (e.g., processor 18).

Beginning at block 62, the process 60 creates one or more physical catalytic converter models 64, such as the kinetic model 45. The control system 16 may employ a model-based control (MBC) technique, in which operating states and conditions of the gas engine system 10 are treated as individual states. In such embodiments, the process 60 may create catalytic converter models 64 based on each individual operating state, each individual operating conditions, or each combination of the individual operating state and operating conditions. The catalytic converter models 64 may be created during offline simulations of the gas engine system 10 and then be saved in the memory 20 (e.g., as look-up tables) for access during other steps of the process 60.

At block 66, the process 60 may create one or more catalytic estimator systems 68, including the estimator 44 detailed above. As previously described, the estimator 44 may include the AEKF system 46. The AEKF system 46 may be tuned to more efficiently provide for estimation of the catalytic system 32 for example, by tuning for high gain, low gain, and so forth. At block 70, the process 60 receives a variety of inputs concerning the state of the gas engine system 10 and the catalytic converter system 32. In particular, the process 60 receives data from at least the sensors 30A, 30B, and 30C.

The process 60 then selects (block 72) a catalytic converter model 64 and an estimator 68 based on the received inputs of block 70. These inputs can include the total air mass flow, the exhaust gas temperature, the oxygen storage capacity of the oxidation structure 40, the Gibbs energy of the oxidation structure 40, the inlet gas composition, pressure, and the like. The received inputs include physical characteristics of the catalytic converter system 32 (e.g., the oxygen storage capacity and Gibbs energy of the oxidation structure 40) that may be stored on the memory 20, as well as empirical data (e.g., the exhaust gas temperature and the inlet gas composition) that is measured by one or more sensors 30.

Next, at block 74, the catalyst estimator system 44 estimates certain system dynamics, such as the oxygen storage dynamics of the catalytic converter system 32. In particular, the catalyst estimator system 44 may estimate the oxygen storage dynamics for the entire catalytic converter system 32, at various locations within the catalytic converter system 32, as well as temperature, pressure, and mass flow for the entire catalytic converter system 32, including inlet and outlet locations. The catalyst estimator system 44 determines estimates 76 based on the selected catalytic converter model 64 and the various measurements from the sensors 30, including pre- and post-cat oxygen measurements. The catalyst estimator system 44 may also take into account the mid-cat oxygen measurement, if available, when determining the estimates 76 of oxygen storage dynamics. Additionally, the catalyst estimator system 44 may determine the estimates 76 based on oxygen intake, which is the amount of oxygen present in the exhaust gases and the oxygen stored within the catalytic converter system 30 that is released and consumed when the amount of oxygen in the exhaust gases is insufficient.

The process 60 also derives (block 78) oxygen storage setpoints 80 for the catalytic converter system 32 based on the selected catalytic converter model 64 and estimator 68. Advantageously, the process 60 derives the oxygen storage setpoints 80, for example, to better control emissions, to improve performance of the catalyst system 32, to account for degradation of the catalyst system 32, to improve performance of the engine 12, or a combination thereof. In one embodiment, the individual setpoints 80 may be derived via a simulation (e.g., offline simulation), and then the derivations stored, for example, in one or more lookup tables for use during operations of the system 10. In another embodiment, the individual setpoints 80 may be derived during operations (e.g., real-time derivation) and used by the engine control unit 16 in real-time.

At block 82, the process 60 compares the system oxygen storage setpoints 80 to the oxygen storage estimates 76. The process 60 then provides the results of the comparison to the engine control unit 16, which uses the comparison to determine (block 84) an AFR setpoint 86. The engine control unit 16 then controls one or more actuators 28 (e.g., the throttle 14) to achieve the AFR setpoint at block 88. In certain embodiments, the process 60 may store the received inputs, the selected catalytic converter model 64, and the oxygen storage estimates 76 on the memory 20 at block 90. The process 60 then analyzes the saved data to determine improvements to the catalytic converter models 64 at block 92. This may be done using one or more machine learning algorithms, such as neural networks and data clustering. By using the analyzed data to improve the catalytic converter models 64, the process 60 may account for changes to the gas engine 12 and the catalytic converter system 32 over time, such as system aging and degradation. As will be appreciated, the process 60 may perform any analysis of the saved data while the gas engine system 10 is offline.

In addition to improving the catalytic converter models 64, the analyzed data may also be used to perform diagnostic tests on the catalytic converter system 32 at block 94. Based on the analyzed data, the process 60 may assign a health state 96 to the catalytic converter system 32 (e.g., in need of maintenance, excellent performance, etc.). In some embodiments, the health state 94 may include data relating to the catalytic converter system 32, such as the amount oxygen saturation, the amount of oxygen stored, or the percentage of a specific reaction species conversion out of all conversions. The process 60 may then communicate the health state 94 to the engine control unit 16, which can take action as necessary.

Figure 6:
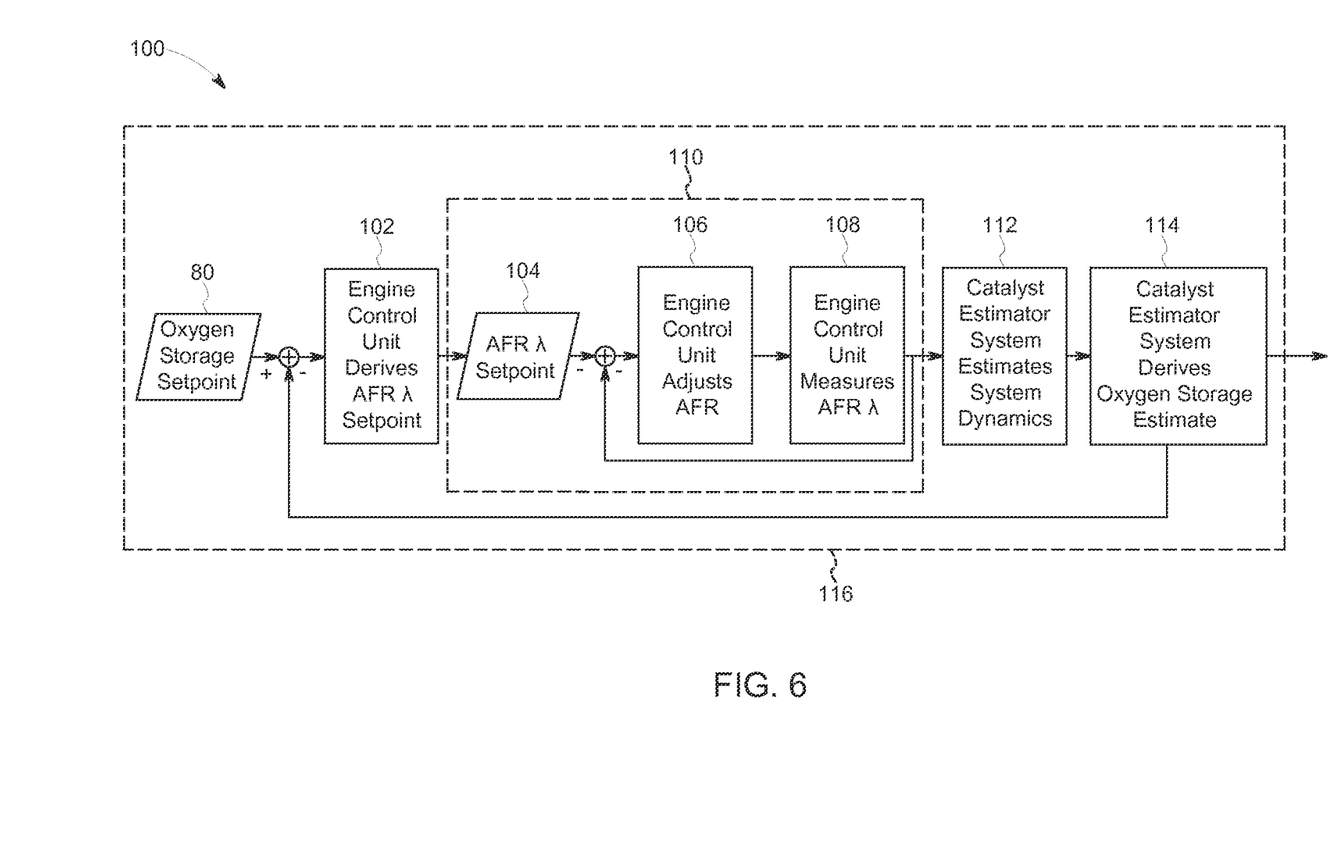
FIG. 6 is a flow chart depicting a control process derived from the method of FIG. 5, in accordance with an embodiment.

For example, FIG. 6 depicts an embodiment of a control process 100 that may be used to control the gas engine system 10. The control process 100 begins with deriving or retrieving the oxygen storage setpoints 80, as described above. Next, at block 102, the engine control unit 16 derives an AFR lambda setpoint 104. The AFR lambda setpoint 104 is a setpoint for the air-to-fuel equivalence ratio, which is often denoted using the Greek letter lambda. The air-to-fuel equivalence ratio measures the ratio of a value of an AFR to the stoichiometric AFR for that particular type of fuel. As such, deriving the AFR lambda setpoint 104 may depend, in part, on deriving the AFR setpoint 86 as described above. Accordingly, block 102 and the AFR lambda setpoint 104 may be considered as a specific example of block 82 and setpoint 86 (shown in FIG. 5), respectively.

At block 106, the engine control unit 106 may adjust the AFR of the engine 12 to achieve the AFR lambda setpoint 104. This action may include controlling the actuators 28 (e.g., the throttle 14) as described above with reference to block 86. After adjusting the AFR, the engine control unit 106 may then measure, based on data from the sensors 30, the actual air-to-fuel equivalence ratio of the engine 12 at block 108. The engine control unit 16 then compares the actual air-to-fuel equivalence ratio to the AFR lambda setpoint 104 and adjusts the AFR as necessary, thereby completing an AFR inner feedback loop 110.

At block 112, the catalyst estimator system 44 may receive the measured air-to-fuel equivalence ratio and, based on the ratio and other inputs (e.g., the pre- and post-cat oxygen measurements, mid-catalyst measurements), estimates the system dynamics 76 of the catalytic converter system 32 as described above with reference to block 74. After estimating the system dynamics 76, the catalyst estimator system 44 derives the oxygen storage setpoints 80 at block 114. At least one of the newly derived oxygen storage setpoints 80 may then compared to the oxygen storage estimates, as described above with reference to block 82. The comparison is then used to derive a new AFR lambda setpoint 104, thereby completing an oxygen storage outer feedback loop 116.

In another embodiment, the block 102 may receive, additionally or alternative to the oxygen setpoint 80, setpoints associated with one or more emission species concentrations (e.g., NOx, COx). The engine control unit 16 may then derive the desired AFR setpoint 104 based on the inputted one or more emission species and/or the setpoint 80. It is also to be noted that the catalyst estimator system 44 may adapt operations to compensate for ageing or degradation. For example, the catalyst estimator system 44 may compare current measurements from sensors 30 with estimates 76, as well as total running time of the system 10 (e.g., running hours) to determine that degradation is taking place. The engine control unit 16 may then derive the AFR setpoint 104, for example, to maintain regulatory compliance, based on the degradation.

Technical effects of the invention include controlling a catalytic converter system based in part on the actual and desired performance of the catalytic converter system. For example, the AFR of a gas engine may be controlled to meet certain emissions criteria of the catalytic converter system. Certain embodiments may allow for more accurate determinations of the actual performance of a catalytic converter system. For example, the present catalyst estimator system may estimate the oxygen storage dynamics of the catalytic converter systems based in part on kinetic models and an Adaptive Extended Kalman Filter (AEKF) system. The models and the AEKF system may also be updated over time using previous estimates. Certain embodiments may also allow for determining the actual and desired performance for all or a portion of the catalytic converter system. Certain embodiments may also include analyzing the performance of the catalytic converter system and determining the health of the catalytic converter system based on the analysis. The technical effects and technical problems in the specification are exemplary and not limiting. It should be noted that the embodiments described in the specification may have other technical effects and can solve other technical problems.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a controller comprising a processor programmed to:
receive a first signal from a first oxygen sensor indicative of a first oxygen measurement, wherein the first oxygen sensor is disposed upstream of a catalytic converter system;
receive a second signal from a second oxygen sensor indicative of a second oxygen measurement, wherein the second oxygen sensor is disposed downstream of the catalytic converter system;
receive a third signal from a nitrogen oxide (NOx) sensor indicative of NOx emissions of the catalytic converter system;
execute a catalyst estimator system, wherein the catalyst estimator system is configured to modify a catalytic converter model based at least in part on the third signal and to derive an oxygen storage estimate based on the first signal, the second signal, and the modified catalytic converter model;
and
compare the oxygen storage estimate with a system oxygen storage setpoint, wherein the processor is configured to apply the comparison during control of a gas engine.

2. The system of claim 1, wherein the catalyst estimator system comprises an Adaptive Extended Kalman Filter (AEKF) system configured to:
derive the oxygen storage estimate; and
adjust the oxygen storage estimate based on the first and the second signal via execution of an augmented state-parameter model.

3. The system of claim 2, wherein the AEKF system is configured to execute the augmented state-parameter model based on an augmented-state parameter vector.

4. The system of claim 1, wherein the processor is configured to derive an air-to-fuel ratio (AFR) setpoint based on the comparison; and adjust a fuel actuator disposed in the gas engine based on the AFR setpoint.

5. The system of claim 1, wherein the catalytic converter model comprises a kinetic catalyst model.

6. The system of claim 5, wherein the kinetic catalyst model models carbon monoxide oxidation, methane oxidation, reduction of nitrogen oxides, or a combination thereof.

7. The system of claim 1, wherein the processor is configured to apply the comparison during control of the gas engine to at least improve overall performance of the catalytic converter system, carbon monoxide oxidation efficiency of the catalytic converter system, or a combination thereof.

8. The system of claim 1, wherein the controller is configured to receive an additional signal from an additional sensor disposed upstream of the catalytic converter system, downstream of the catalytic converter system, or inside the catalytic converter system, wherein the additional sensor comprises a carbon monoxide sensor, a mass flow sensor, a pressure sensor, a temperature sensor, an oxygen sensor, or a combination thereof, and wherein the controller is configured to further use the additional signal when modifying the catalytic converter model.

9. The system of claim 1, wherein the processor is configured to derive an air-to-fuel ratio (AFR) setpoint based at least in part on the third signal; and adjust a fuel actuator disposed in the gas engine based on the AFR setpoint.

10. A system comprising:
a gas engine system comprising a gas engine fluidly coupled to a catalytic converter system;
a catalytic controller operatively coupled to the gas engine, and communicatively coupled to the catalytic converter, the catalytic controller comprising a processor programmed to:
receive a first signal from a first oxygen sensor indicative of a first oxygen measurement, wherein the first oxygen sensor is disposed upstream of a catalytic converter system;
receive a second signal from a second oxygen sensor indicative of a second oxygen measurement, wherein the second oxygen sensor is disposed downstream of the catalytic converter system;

receive a third signal from a nitrogen oxide (NOx) sensor indicative of NOx emissions of the catalytic converter system;

execute a catalyst estimator system, wherein the catalyst estimator system is configured to derive an oxygen storage estimate based on the first signal, the second signal, and a catalytic converter model;

compare the oxygen storage estimate with a system oxygen storage setpoint, wherein the processor is configured to apply the comparison during control of a gas engine; and derive an air-to-fuel ratio (AFR) setpoint based on the comparison and the third signal, wherein the AFR setpoint is applied to control the gas engine.

11. The system of claim 10, wherein the catalyst estimator system comprises an Adaptive Extended Kalman Filter (AEKF) system configured to:

derive the oxygen storage estimate; and adjust the oxygen storage estimate based on the first and the second signal via execution of an augmented state-parameter model.

12. The system of claim 11, wherein the AEKF system is configured to execute the augmented state-parameter model based on an augmented-state parameter vector.

13. The system of claim 10, wherein the controller is configured to receive an additional signal from an additional sensor disposed upstream of the catalytic converter system, downstream of the catalytic converter system, or inside the catalytic converter system, wherein the sensor comprises a carbon oxide (COx) sensor, a mass flow sensor, a pressure sensor, a temperature sensor, or a combination thereof, and wherein the controller is configured to derive the AFR setpoint based additionally on the additional signal.

14. The system of claim 10, wherein the processor is configured to determine a health state of the catalytic converter system based on the plurality of oxygen storage estimates.

15. A method, comprising:

receiving a first signal from a first oxygen sensor indicative of a first oxygen measurement, wherein the first oxygen sensor is disposed upstream of a catalytic converter system;

receiving a second signal from a second oxygen sensor indicative of a second oxygen measurement, wherein the second oxygen sensor is disposed downstream of the catalytic converter system;

receiving a third signal from a nitrogen oxide (NOx) sensor indicative of NOx emissions of the catalytic converter system;

executing a catalyst estimator system, wherein the catalyst estimator system is configured to modify a catalytic converter model based on the third signal and to derive an oxygen storage estimate based on the first signal, the second signal, and a catalytic converter model;

deriving a system oxygen storage setpoint for the catalytic converter system based on the catalytic converter model;

comparing the oxygen storage estimate with the system oxygen storage setpoint; and applying the comparison during control of a gas engine.

16. The method of claim 15, wherein the catalyst estimator system comprises an Adaptive Extended Kalman Filter (AEKF) system configured to:

derive the oxygen storage estimate; and adjust the oxygen storage estimate based on the first and the second signal via execution of an augmented state-parameter model.

17. The method of claim 16, wherein the AEKF system is configured to execute the augmented state-parameter model based on an augmented-state parameter vector.

18. The method of claim 15, wherein the catalytic converter model comprises a kinetic catalyst model configured to model chemical kinetics of carbon monoxide oxidation, a reduction of nitric oxide, a methane, or a combination thereof.

19. The method of claim 15, wherein the instructions are configured to receive an additional signal from an additional sensor disposed upstream of the catalytic converter system, downstream of the catalytic converter system, or inside the catalytic converter system, wherein the sensor comprises a carbon oxide (COx) sensor, a mass flow sensor, a pressure sensor, a temperature sensor, or a combination thereof, and wherein the instructions are configured to further use the additional signal when modifying the catalytic converter model.

20. The method of claim 19, wherein the instructions are configured to derive an air-to-fuel ratio (AFR) setpoint based on the comparison, the third signal, the additional signal, or a combination thereof; and adjust a fuel actuator disposed in the gas engine based on the AFR setpoint.

\* \* \* \* \*